(12) United States Patent
Berier et al.

(10) Patent No.: US 7,646,938 B2
(45) Date of Patent: Jan. 12, 2010

(54) METHOD AND SYSTEM FOR SUPER-RESOLUTION OF CONFOCAL IMAGES ACQUIRED THROUGH AN IMAGE GUIDE, AND DEVICE USED FOR IMPLEMENTING SUCH A METHOD

(75) Inventors: Frédéric Berier, Plouarzel (FR); Aymeric Perchant, Paris (FR)

(73) Assignee: Mauna Kea Technologies, Paris (FR)

( * ) Notice: Subject to any disclaimer, the term of this patent is extended or adjusted under 35 U.S.C. 154(b) by 751 days.

(21) Appl. No.: 10/585,083

(22) PCT Filed: Dec. 29, 2004

(86) PCT No.: PCT/FR2004/003401

§ 371 (c)(1),
(2), (4) Date: Jun. 29, 2006

(87) PCT Pub. No.: WO2005/073912

PCT Pub. Date: Aug. 11, 2005

(65) Prior Publication Data

US 2007/0273930 A1    Nov. 29, 2007

(30) Foreign Application Priority Data

Dec. 31, 2003   (FR) .................................. 03 15628

(51) Int. Cl.
*G06K 9/32* (2006.01)
*G06F 15/00* (2006.01)

(52) U.S. Cl. ...................................... 382/298; 358/1.2

(58) Field of Classification Search .................. 358/1.2, 358/3.27, 505, 509, 513, 530, 532, 480, 479, 358/482; 382/298; 356/101, 318, 141.1, 356/28, 4.01, 28.5
See application file for complete search history.

(56) References Cited

U.S. PATENT DOCUMENTS 4,618,884 A     10/1986    Nagasaki
(Continued)

FOREIGN PATENT DOCUMENTS

| EP | 0 731 600 | 9/1996 |
|----|-----------|--------|
| EP | 1 001 374 | 5/2000 |
| JP | 2004289365 | * 4/2006 |

OTHER PUBLICATIONS

Lee et al. "Scattered Data Interpolation with Multilevel B-Splines", IEEE Transactions on Visualization and Computer Graphics, vol. 3, No. 3, Jul.-Sep. 1997, pp. 228-244, XP-000702051.
Lertrattanapanich et al., "High Resolution Image Formation From Low Resolution Frames Using Delaunay Triangulation", IEEE Transactions on Image Processing, vol. 11, No. 12, Dec. 2002, pp. 1427-1441.

(Continued)

*Primary Examiner*—Jerome Grant, II
(74) *Attorney, Agent, or Firm*—Young & Thompson

(57) ABSTRACT

A method for increasing the resolution of confocal images acquired through an image guide whereof the distal end is associated with an optical head for focusing the laser beam emitted by the image guide in an observation object. For a given position of the optical head, the method includes the following steps: producing a plurality of acquisitions through the image guide, each acquisition being produced for a specific spatial shift of the distal end of the guide image relative to the optical head which remains stationary; transforming the data of each acquisition into a point cloud; registering each scatter plot relative to a point cloud taken as reference; superimposing the thus registered point clouds; and reconstructing a final image from the superimposition. Advantageously, a controlled piezoelectric tube is used arranged about the distal end of the image guide to shift the latter.

20 Claims, 2 Drawing Sheets

U.S. PATENT DOCUMENTS

| | | | |
|---|---|---|---|
| 6,466,618 | B1 | 10/2002 | Messing et al. |
| 6,665,063 | B2 * | 12/2003 | Jamieson et al. ......... 356/141.1 |
| 6,678,398 | B2 * | 1/2004 | Wolters et al. ............. 382/128 |
| 2004/0222365 | A1 * | 11/2004 | Tobiason ............... 250/231.13 |
| 2005/0162646 | A1 * | 7/2005 | Tedesco et al. ............. 356/301 |

OTHER PUBLICATIONS

Patti et al., "Artifact Reduction for Set Theoretic Super Resolution Image Reconstruction with Edge Adaptive Constraints and Higher-Order Interpolants", IEEE Transactions on Image Processing, vol. 10, No. 1, Jan. 2001, pp. 179-186.

Shekarforoush et al., "Data-driven Multi-channel Super-resolution with Application to Video Sequences", ONR Grant N00014-95-1-0521, Computer Vision Laboratory Center for Automation Research, Apr. 1998, pp. 1-20.

Patti et al., "Super Resolution Video Reconstruction with Arbitrary Sampling Lattices and Non-zero Aperture Time", IEEE Transactions on Circuits and Systems for Video Technology, vol. XX, No. Y, 1999, pp. 1-13.

Kornprobst et al., "Superresolution in MRI and its influence in statistical analysis", INRIA Sophia Antipolis, Jul. 2002, pp. 1-36.

* cited by examiner

- ● 1st Acquisition
- ◉ 2nd Acquisition
- ◉ 3rd Acquisition

● : Centre of a fibre

◯ : Zone of influence of a fibre

METHOD AND SYSTEM FOR SUPER-RESOLUTION OF CONFOCAL IMAGES ACQUIRED THROUGH AN IMAGE GUIDE, AND DEVICE USED FOR IMPLEMENTING SUCH A METHOD

This invention relates to a method and system for super-resolution of confocal images acquired through an image guide, as well as a device used for implementing such a method.

It has a particularly useful application in the field of medical imaging. However, the invention is wider in scope since it can be applied to any field in which imaging is carried out by means of a guide comprising a plurality of optical fibres, such as for example in the field of viewing the inside of a manufactured device.

The image guide makes it possible to obtain an image. Such a device makes it possible to move the laser scanning, the light source and the receiver some distance from the object to be observed. For example in a laser scanning system in which a confocal image is obtained, the image guide is an assembly of several thousand optical fibres the spatial arrangement of which is identical on entering and on leaving.

The distal end, i.e. the one that is close to the object to be observed, therefore some distance from the light source, is associated with a head constituted by optics in order to focus the laser beam in the object to be observed. Such an image guide makes it possible to observe the object in-depth, with a lateral resolution and a field of view which depend on the magnification of the optics, the inter-core distance of the image guide and the guide diameter. By modifying the magnification, the resolution can be varied, to the detriment of the field. In the same way, an image guide which is similar, but with a smaller inter-core distance, makes it possible to obtain the same results. In both cases, when the resolution is smaller, the imaged field also reduces.

An image guide is a fixed structure in which the relationship between the useful surface to the number of cores present defines the resolution of the system. For the same imaged field, and therefore the same image guide surface, the inter-core distance between fibres cannot be reduced, because of physical and technological constraints. Firstly, manufacturing constraints come into play, then physical constraints linked to the background noise of the guide, and to the optical properties of the fibres making it possible to guide the light around the visible wavelengths.

Thus the physical guiding limits per bundle of optical fibres do not make it possible to obtain a better resolution with fixed magnification and field.

In numerous fibre-type confocal imaging applications, the search for better resolution is of prime importance. In a medical application for example, viewing a cell or components of the cell requires a resolution which can go beyond the physical limits of this technology.

Numerous works on super-resolution exist carried out using a standard camera, where the sampling diagram is regular and arranged according to a square or rectangular grid. These works make much use of the spatial regularity of the sampling. In particular, works on super-resolution are known where the sampling originating from a set of acquisitions is an interlaced sampling. The following publications can for example be mentioned:

H. Shekarforoush and R. Chellappa. "*Data-driven multichannel super-resolution with application to video sequences*". Journal of the Optical Society of America A, 16 (3):481-492, March 1999;

R. Kornprobst, R. Peeters, T. Vieville, G. Malandain, S. Mierisova, S. Sunaert, and O. Faugeras and R. Van Hecke; "*Superresolution in mri and its influence in statistical analysis*"; Technical Report No. 4513, INRIA, July 2002; and S. Lertraltanapanich and N. K. Bose; "*High resolution image formation from low resolution frames using delaunay triangulation*"; IEEE Transactions on Image Processing, vol. 11(No. 12), December 2002.

Finally works are known describing a system where the movement between several views is fairly free and produces a truly irregular sampling. The system transfer function described is spatially variant, and the relationship between the width of the transfer function and the distance separating the sampling points is not constant over the acquisition, which results in taking account of the optics of the system, and thus a fairly complex resolution. Such a system is in particular disclosed in the following documents:

A. Patti, M. Sezan, and M. Tekalp; "*Superresolution video reconstruction with arbitrary sampling laffices and nonzero aperture time*"; IEEE Trans. on Image Processing, pages 1064-1078, August 1997; and Andrew J. Patti and Yucel Altunbasak; "*Artifact reduction for set theoretic super resolution image reconstruction with edge adaptive constraints and higher-order interpolants*"; IEEE Transactions on Image Processing, 10(1): 179-186, January 2001.

The purpose of the present invention is to increase the resolution of an image acquired through an image guide. Another notable purpose of the invention is to apply the concept of super-resolution to an image guide.

Another purpose of the invention is to improve the resolution of a constant-field image acquired through an image guide by increasing the number of measurement points per surface unit.

At least one of the abovementioned objectives is achieved with a method for increasing the resolution of confocal images acquired through an image guide constituted by a plurality of optical fibres, the proximal end of this image guide being connected to a laser scanning device provided for emitting a laser beam into each optical fibre of the image guide and collecting each return beam during an acquisition, the distal end being associated with an optical head for focusing the laser beam emitted by the image guide in an object under observation. According to the invention, for a given position of the optical head, this method comprises the steps of:

carrying out a plurality of acquisitions through the image guide, each acquisition being produced for a given spatial shift of said distal end of the image guide relative to the optical head, transforming the data of each acquisition into a point cloud weighted by the optical power measured on the object through each optical fibre of the image guide, positioning each point cloud relative to a point cloud taken as reference, superimposing the thus positioned point clouds, and reconstructing a final image from this superimposition.

With the method according to the invention, a redundant acquisition of the same object is produced before a step of reconstructing the final image. For a given position of the optical head, several acquisitions are carried out, each acquisition corresponding to a given position of the image guide.

Throughout the remainder of the description, although linguistically incorrect, the expression step of point cloud positioning is used to signify that in fact each point cloud is processed so as to position the images corresponding to these point clouds, without necessarily reconstructing these images.

In particular, a single acquisition through the image guide is equivalent to an acquisition on an irregular grid (which is the location of the fibres), hereafter referred to as sampling of the object. The movement of the image guide in the tube comes down to moving the sampling diagram which is the arrangement of the individual fibres in the image guide. With two acquisitions, two samplings of the same object are thus obtained, but spatially shifted. By superimposing them, a sampling is obtained with twice as many measurement points. By multiplying the experiment, a larger sampling point cloud is obtained. The resulting sampling is irregular and must be reconstructed in the form of an image.

The step of transforming the acquired data can be followed by the application of a filter in order to eliminate artefacts due to the presence of the image guide. This filter can consist of a method for processing images acquired using a guide constituted by a plurality of optical fibres. More precisely, for each optical fibre, on the acquired image (the raw data) a zone corresponding to this optical fibre is isolated, then the information from this zone is used in order to estimate the power transmitted by this fibre, and the power originating from the object under observation via this same fibre. A representation of the object under observation is then a weighted point cloud which can be reconstructed in the form of an image by interpolation of said weighted point cloud on a square grid. Such a transformation (estimation of the power+interpolation) makes it possible to eliminate the pattern due to the optical fibres.

According to an embodiment of the invention, the positioning step comprises the following steps:
  correction of the geometrical distortions,
  reconstruction of a reference image designated "fixed image" by interpolation of a reference point cloud referred to as a "fixed point cloud",
  for every other point cloud, designated "mobile point cloud", reconstruction of an image referred to as "mobile", then optimization of a mean square error calculated between said mobile image and said fixed image.

Advantageously, the mean square error is calculated considering only the pixels corresponding to the points of said mobile point clouds.

The interpolation algorithm is for example an iterative sequence of B-spline approximations disclosed in particular in the following document: Seungyong Lee, George Wolberg, and Sung Yong Shin; "*Scattered data interpolation with multilevel b-splines*"; IEEE transactions on visualization and computer graphics, 3(3), July-September 1997.

Advantageously, the reference point cloud can correspond to a position of the image guide at rest.

According to the invention, the positioning step can for example consist of positioning each point cloud as a function of predetermined shift distances obtained by a step of calibrating the movements of the image guide.

Preferably, at each acquisition, in order to shift the image guide relative to the optical head, at least one voltage is applied to at least one piezoelectric strip, which is at least integral with the distal end of this image guide. By way of example, four strips are used, constituting a piezoelectric tube which surrounds at least the distal end of the image guide, and, for each movement of the distal end of the image guide, a pair of opposite voltages are applied to two opposite strips respectively. Moreover, the spatial shift is obtained by a substantially lateral translation movement of the distal end of the image guide in two orthogonal or at least non-colinear directions.

Advantageously, the calibration step can be carried out by applying the following steps to a limited number of point clouds obtained by acquisition of a reference pattern arranged in the place of said object under observation:
  correction of geometric distortions,
  reconstruction of a reference image, designated "fixed image", by interpolation of a reference point cloud referred to as a "fixed point cloud",
  for every other point cloud, designated a "mobile point cloud", reconstruction of an image referred to as "mobile", then optimization of a mean square error calculated between said mobile image and said fixed image,
  production of a linear model describing the shift distance obtained between fixed image and mobile image as a function of the voltage applied to the piezoelectric strip in order to produce this shift.

The calibration makes it possible to validate a model of linear movements as a function of the voltage applied and to estimate a shift coefficient as a function of the measurements. The subsequent point clouds are then positioned using this linear model.

Moreover, the step of reconstructing the final image can be carried out using a so-called iterative B-spline approximation algorithm for which the superimposition is considered as an irregular-points cloud. This algorithm displays good mathematical behaviour, good stability, and is of reasonable cost in terms of calculation time.

The problem of reconstruction from several acquisitions is the same as that of reconstruction knowing only a single acquisition with a non-linear system. It is assumed here that the equivalent transfer function of the system is spatially variant, and that the sampling is irregular.

The step of reconstructing the final image can be followed by a step of deconvolution of the final image if the thus-synthesized sampling is redundant.

According to another aspect of the invention, a device is proposed for increasing the resolution of confocal images acquired through an image guide constituted by a plurality of optical fibres, the proximal end of this image guide being connected to a laser scanning device provided in order to emit a laser beam into each optical fibre of the image guide and collect each return beam during an acquisition, the distal end being associated with an optical head for focusing the laser beam emitted by the image guide in an object under observation. According to the invention, the optical head comprises optical means integral with this optical head. The device also comprises a piezoelectric tube surrounding the image guide and integral with this image guide, at least at said distal end, so as to spatially shift this distal end relative to the optical head in response to a shift order. This set value is preferably a pair of voltages applied to the piezoelectric tube.

The piezoelectric tube is advantageously constituted by at least four independent ceramic strips each occupying a quarter of the tube. The internal and external faces of each strip can be covered with metallic material, such as silver, such that the application of opposite voltages to two opposite strips respectively, shifts the distal end of the tube by exploiting the transverse piezoelectric effect. More precisely, the ceramic strips can be controlled two by two in two orthogonal directions.

A system is also proposed for increasing the resolution of confocal images acquired through an image guide constituted by a plurality of optical fibres, the proximal end of this image guide being connected to a laser scanning device provided for emitting a laser beam into each optical fibre of the image guide and collecting each return beam during an acquisition, the distal end being associated with an optical head for focusing the laser beam emitted by the image guide in an object under observation. According to the invention, for a given position of the optical head, this system comprises:

means for producing a plurality of acquisitions through the image guide, means for spatially shifting, at each acquisition, said distal end of the image guide relative to the optical head, means for transforming data from each acquisition into a point cloud weighted by the optical power measured on the object through each optical fibre of the image guide, means for positioning each point cloud, means for superimposing the thus-positioned point clouds, and means for reconstructing a final image from this superimposition.

This invention will be better understood and other advantages will become apparent in light of the following description of an embodiment, said description being made with reference to the drawings in which.

Figure 1:
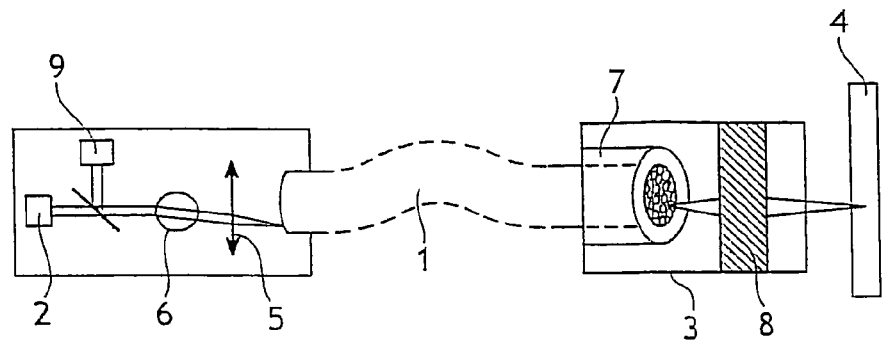
FIG. 1 is an exploded diagrammatic view of the overall system according to the invention.

FIG. 1 shows an ordered bundle of flexible optical fibres (in particular several tens of thousands) forming an image guide 1 with, at its proximal end, a light source 2 and a fibre injection system making it possible to illuminate the fibres one by one and, at its distal end, an optical head 3 making it possible to focus the beam leaving the illuminated fibre at a point situated at a given depth of the object under observation 4. The injection system comprises several optical elements 5 preceded by a fibre scanning system 6, such as a deflection unit, making it possible to scan the fibres one by one at very high speed. Each fibre is used in turn to convey the illumination beam and also the corresponding return beam originating from the object under observation. The spatial resolution is obtained by focusing the laser beam into a point and by the confocal character residing in the spatial filtering of the object under observation by the same fibres as those used for the illumination. This makes it possible to receive, by means of a photodetector 9, exclusively the signal originating from the object under observation and to produce an image point by point.

The distal end of the image guide is inserted into a piezoelectric tube 7, itself mounted in a rigid tube 3 forming an optical head and containing optics 8 placed at the outlet of the image guide 1. The piezoelectric tube 7 makes it possible to move the image guide 1 inside the optical head 3 which remains fixed relative to the object under observation. This avoids problems resulting from the friction of the optical head on the object under observation.

Figure 2:
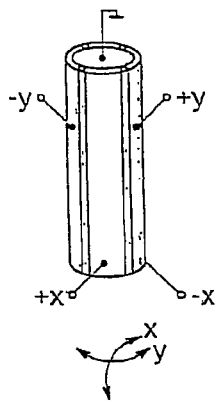
FIG. 2 is a diagrammatic view of the piezoelectric tube surrounding the image guide.

FIG. 2 shows in perspective the configuration of the piezoelectric tube 7. This tube 7 is constituted by four ceramic parts each occupying a quarter cylinder. The tube 7 is coated with silver on the internal and external faces in order to exploit the transverse piezoelectric effect. This phenomenon explains the deformation of a crystal when the latter is immersed in an electric field, resulting from the existence of electric dipoles in the crystalline configuration.

Figure 3:
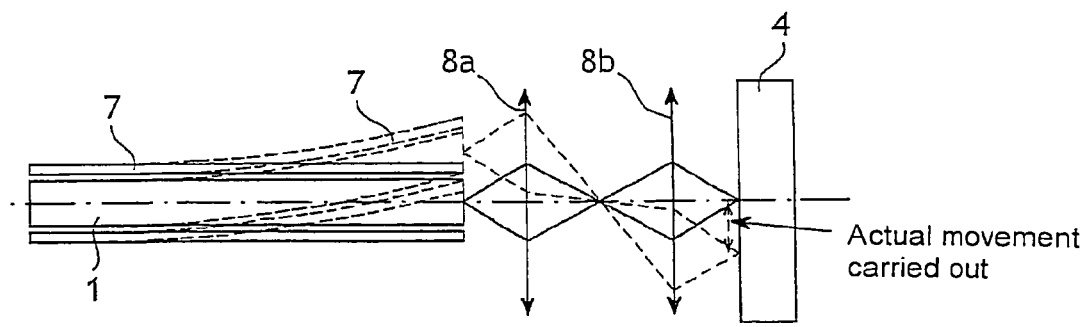
FIG. 3 is a diagrammatic view illustrating the movement of the end of the image guide.

When a voltage is applied between the internal and external faces of a ceramic, the latter extends (or contracts depending on the sign of the voltage) and becomes finer (or wider, respectively). The scanning is therefore carried out by applying a positive voltage to one of the ceramics and the opposite voltage to the opposite ceramic. As one face extends and the opposite face contracts, the tube 7 curves and its free end moves. It is thus possible to shift the distal end of the fibres along two orthogonal axes, in both directions. FIG. 3 illustrates a movement of the piezoelectric tube 7 along one axis. The unbroken lines represent the at-rest position, without shift. The dotted lines represent the end of the upwardly-shifted piezoelectric tube 7, thus resulting in the shifting of the distal end of the image guide 1. By contrast the optics 8a and 8b, integral with the optical head, as well as the object under observation 4 remain fixed. The movement of the distal end of the image guide corresponds to a movement of the point of impact of the laser beam on the object under observation.

For each pair of voltages applied to the piezoelectric tube 7, a deformation is produced, and the acquisition carried out through the image guide 1 is thus shifted by a distance proportional to the voltages applied.

The super-resolution method according to the invention comprises a first step in which, for a given fixed position of the optical head, a series of acquisitions is carried out. For each acquisition, the laser beam scans all of the optical fibres. The photodetector 9 then retrieves a set of raw data which can be represented by arranging them on a grid following the order of the laser scanning. For each fibre domes are seen to appear, representing the position of the fibres in the guide relative to the laser scanning. The shift of the distal end of the image guide 1 does not change the arrangement or the position of the optical fibres at the proximal end of the image guide. By contrast the object observed through these domes which can be compared with a grid with holes is shifted when the piezoelectric tube 7 is deformed.

Then these raw data are transformed into a point cloud weighted by the optical power measured on the object, through each fibre of the image guide. This transformation makes it possible for each point to represent the information actually seen by each fibre during the laser scanning. A filter can also be applied to each point cloud so as to eliminate artefacts (grid) linked with the presence of the image guide.

By producing several acquisitions with different positions of the distal end of the image guide, it is as if sampling points had been created, shifted for example vertically and horizontally. The number of acquisitions and the directions are limited only by the precision of the piezoelectric tube 7.

Figure 4:
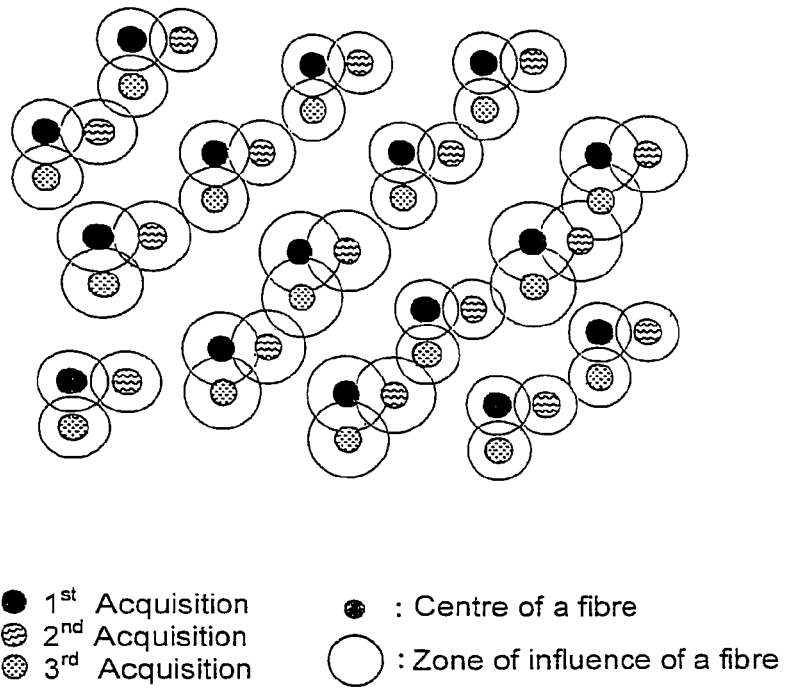
FIG. 4 is a diagrammatic view illustrating an irregular superimposition of point clouds.

FIG. 4 shows, for each fibre, a zone of influence which can be defined as the width of the optical transfer function of each fibre combined with that of the optics placed between the outlet of the image guide and the object under observation. It should be noted that the transfer function of one fibre is not necessarily equal to that of the adjacent fibre. In practice they can be considered as all being different, at least in width.

Before being able to superimpose the point clouds, they must be positioned. In fact, the same object has been acquired, but the sampling diagram is shifted. After correction of the geometrical distortions of the system, the shift comes down to a translation which is evaluated by comparing all the acquisitions of the same object with a reference acquisition, in general that where the piezoelectric tube 7 is at rest (by convention).

The problem of positioning of the images is a fairly standard subject and numerous techniques exist. The problem consists of positioning two images of the same object taken before and after shifting by means of the piezoelectric mechanism. In the present case, the underlying transformation model is a translation model. The number of parameters to be estimated is therefore only two (x, y). However, the transformation model of the present case differs from many studies, as an irregular grid is used.

In the present case, the best transformation is sought by minimizing a cost function with two parameters (the translation values along the translation axes). It can for example be considered that the problems at the edges are negligible as the movements are small. The sought solution is then close to (0, 0).

Figure 5:
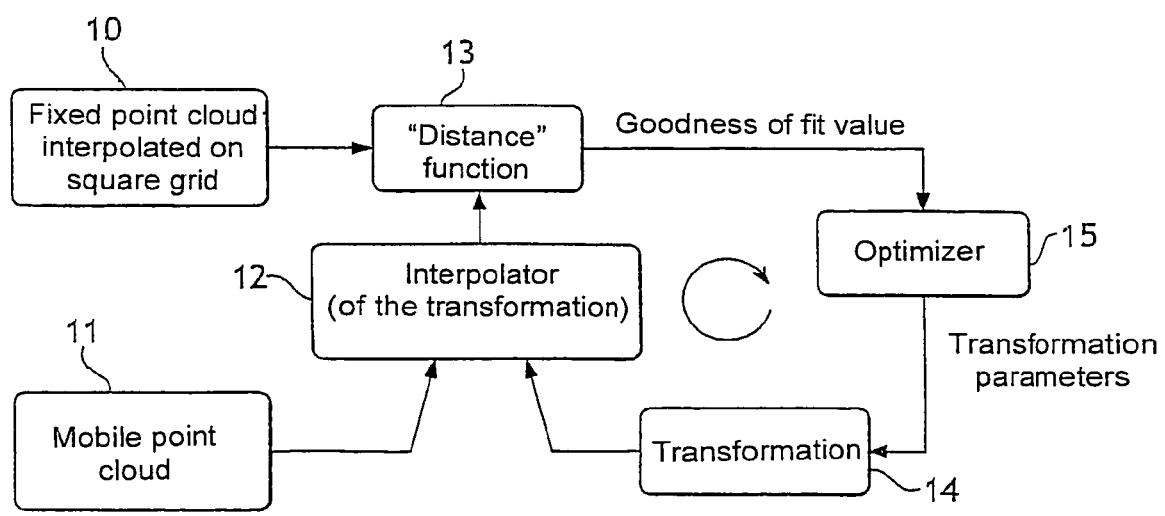
FIG. 5 is a block diagram illustrating the principle of positioning the point clouds.

The adopted algorithm principle is illustrated in FIG. 5. Generally, a reference point cloud will be defined, hereafter designated "fixed point cloud". This fixed point cloud will then be interpolated so as to reconstruct an image hereafter designated "fixed image" 10.

In particular, the interpolation of the fixed point cloud in order to obtain the fixed image is carried out using the iterative b-spline approximation algorithm disclosed in the document of Seungyong Lee et al., which is described briefly below. In order not to calculate the interpolation value each time, an interpolation is carried out on a fine, preferably square regular grid, then the closest is chosen. Thus an interpolation which is fairly smooth and very quickly calculated is obtained.

Then an interpolation is carried out of every other point cloud, hereafter designated mobile point cloud, so as to reconstruct a mobile image. Then the mean square error between each mobile image and the fixed image is optimized. Advantageously, a pixel by pixel calculation between two images, as is the standard case is not carried out, but a calculation is carried out taking into account only the pixels corresponding to the points of the mobile point cloud. The advantage is a considerable saving in time.

The optimization is carried out with a loop, the steps of which are:

A transformation step 14 in which the translation parameters which will be evaluated in the loop are defined;

An step of interpolation 12 of the transformation, in which the initial mobile point cloud is translated by the transformation in process;

A distance calculation step 13, in which a distance between the mobile image originating from the translated mobile point cloud 11 and the fixed image 10 representing the fixed point cloud is measured. This distance is a mean square error evaluated between the points of the mobile point cloud and the interpolated fixed image;

An optimization step in which an optimizer 15 based on a gradient, such as a conjugated gradient is used. The optimizer 15 evaluates the local variations in the previously calculated distance in order to find a new transformation (i.e. translation) which makes it possible to reduce the value of the distance (i.e. to optimize it) to the next loop.

The loop is exited when the distance function no longer decreases.

So as not to have to carry out the process of positioning which has just been described for all the point clouds, this positioning process will be carried out for a reference object with a limited number of acquisitions. In order to do this, the object under observation is replaced by the reference object, such as a calibration pattern or more precisely a resolution pattern for example. The results obtained during this positioning of a limited number of point clouds then make it possible to calibrate the shifts of the piezoelectric tube as a function of the voltages applied. The image guide 1 and optical head 3 assembly can turn relative to the axis of the scanning of the confocal part 5, 6, and thus at least the axis of the movements as well as their direction must be estimated. To do this, a limited number of possible shifts, for example 64, is carried out and they are positioned relative to a common reference, for example a point cloud obtained when the piezoelectric tube is at rest. Then a linear regression is carried out on all of the voltage pairs applied to the piezoelectric—shift measured per positioning. If this model is linear and has a satisfactory precision (much less than the inter-core distance), the model is considered valid, and it can subsequently be used directly on the later acquisitions produced on the measurement object, without having to re-position the images represented by the point clouds. This preferred embodiment therefore allows a much more rapid processing since the point clouds acquired with the object under observation do not undergo the entire positioning process with interpolation. This process is carried out only for 64 point clouds acquired with one or other resolution pattern.

It can also be envisaged, in a non-preferred mode, to use the object under observation directly rather than a resolution pattern in order to produce the linear model from a limited number of point clouds.

In the case where the model is not linear, or if it is imprecise, or if there is hysteresis, it cannot be used. In this case, the degraded mode described previously should therefore be implemented, i.e. each point cloud which must be the subject of super-resolution must be interpolated, then positioned.

When all the shifts are known, the corresponding shift is subjected to each sampling, and they are superimposed. Thus a synthesized acquisition is obtained with as many more points than acquisitions. The reconstruction is then carried out in two phases. Firstly, the resulting weighted point cloud is approximated, or interpolated, with standard methods. It is taken into account that this resulting cloud is irregular. For example the iterative b-spline approximation as defined previously is used during the positioning. This algorithm can be briefly described hereafter:

Let f be the function to be reconstructed. f will be expressed in the form of a uniform bicubic B-spline function defined on a rectangular mesh Φ covering the support f. The function obtained is therefore $C^2$. The values associated with the nodes of the mesh are marked $\Phi_{ij}$. Without loss of general applicability, it is assumed that this mesh is composed of the points of whole coordinates over a rectangle of the plane.

Knowing the values of the control points $\Phi_{ij}$, f is given by:

$$f(x, y) = \sum_{k=0}^{3} \sum_{l=0}^{3} [\phi_{\lfloor x \rfloor-1+k, \lfloor y \rfloor-1+l} B_k(x - \lfloor x \rfloor) B_l(y - \lfloor y \rfloor)] \quad (1)$$

The B-spline is given by:

$$B_0(t) = \frac{1}{6}(1-t)^3$$

$$B_1(t) = \frac{1}{6}(3t^3 - 6t^2 + 4)$$

$$B_2(t) = \frac{1}{6}(-3t^3 + 3t^2 + 3t + 1)$$

$$B_3(t) = \frac{1}{6}t^3$$

The estimation of the control points $\Phi_{ij}$ takes place by iterative approximations, using hierarchical lattices, passing from one scale to the following scale by refining the lattice by a factor of 2. Each sampling point will influence 16 control points. Without reversing the whole of the system, the contributions of the preceding scales will be calculated locally at each scale, and the residues to be estimated for this scale deduced. Each sampling point will influence the 16 closest control points.

This algorithm makes it possible to obtain an interpolation at the convergence of the algorithm (finite number of iterations). In the present case, two limit cases for the size of the lattice can be considered. The first is the case where there is not a single control point $\Phi_{i,j}$ which is not influenced by at least one sampling point. The second is the case where any two sampling points cannot influence the same control point. These two cases make it possible to calculate the size of the starting lattice, and the size of the lattice making it possible to achieve convergence. These sizes can be calculated empirically, assuming that the distribution of the points is that of a hexagonal sampling. The histogram of the distances between the adjacent sampling points is observed (within the meaning of their Voronoï diagram) is observed, and the quantiles is kept at 5% (or any other low percentage). This minimal distance is in fact the distance between two shifts.

Other algorithms make it possible to reconstruct a point cloud with satisfactory results. The originality resides in the formalization of the problem in the form of interpolation or approximation of an irregular point cloud.

According to the invention, a step of deconvolution of the signal is then optionally carried out, making the approximation that the system is invariant linear, and taking an average transfer function of a fibre of the image guide. Wiener filtering can for example be used.

Of course, the invention is not limited to the examples which have just been described and numerous changes can be made to these examples without exceeding the scope of the invention.

The invention claimed is:

1. Method for increasing the resolution of confocal images acquired through an image guide constituted by a plurality of optical fibres, the proximal end of this image guide being connected to a laser scanning device provided for emitting a laser beam into each optical fibre of the image guide and collecting each return beam during an acquisition, the distal end being associated with an optical head for focusing the laser beam emitted by the image guide in an object under observation, characterized in that, for a given position of the optical head, this method comprises the steps of:
carrying out a plurality of acquisitions through the image guide, each acquisition being produced for a given spatial shift of said distal end of the image guide relative to the optical head,
transforming the data of each acquisition into a point cloud weighted by the optical power measured on the object through each optical fibre of the image guide,
positioning each point cloud relative to a point cloud taken as reference,
superimposing the thus positioned point clouds, and
reconstructing a final image from this superimposition.

2. Method according to claim 1, characterized in that the step of transforming the acquired data is followed by the application of a filter in order to eliminate artefacts due to the presence of the image guide.

3. Method according to claim 2, characterized in that the positioning step comprises the following steps:
correction of the geometrical distortions,
reconstruction of a reference image designated "fixed image" by interpolation of a reference point cloud referred to as a "fixed point cloud",
for every other point cloud, designated "mobile point cloud", reconstruction of an image referred to as "mobile", then optimization of a mean square error calculated between said mobile image and said fixed image.

4. Method according to claim 1, characterized in that the positioning step comprises the following steps:
correction of the geometrical distortions,
reconstruction of a reference image designated "fixed image" by interpolation of a reference point cloud referred to as a "fixed point cloud",
for every other point cloud, designated "mobile point cloud", reconstruction of an image referred to as "mobile", then optimization of a mean square error calculated between said mobile image and said fixed image.

5. Method according to claim 4, characterized in that the mean square error is calculated by considering only the pixels corresponding to the points of said mobile point clouds.

6. Method according to claim 5, characterized in that the interpolation consists of a so-called iterative B-spline approximation algorithm.

7. Method according to claim 4, characterized in that the interpolation consists of a so-called iterative B-spline approximation algorithm.

8. Method according to claim 4, characterized in that the fixed point cloud corresponds to a position of the image guide at rest.

9. Method according to claim 1, characterized in that the positioning step consists of positioning the point clouds as a function of predetermined shift distances obtained by a step of calibrating of the movements of the image guide.

10. Method according to claim 9, characterized in that the calibration step is carried out by applying the following steps to a limited number of point clouds obtained by acquisition of a reference pattern arranged in the place of said object under observation:
correction of geometrical distortions,
reconstruction of a reference image designated "fixed image" by interpolation of a reference point cloud referred to as a "fixed point cloud",
for every other point cloud, designated "mobile point cloud", reconstruction of an image referred to as "mobile", then optimization of a mean square error calculated between said mobile image and said fixed image,
production of a linear model describing the shift distance obtained between fixed image and mobile image as a function of the voltage applied to the piezoelectric strip in order to produce this shift.

11. Method according to claim 1, characterized in that at each acquisition, in order to shift the image guide relative to the optical head, at least one voltage is applied to at least one piezoelectric strip, which is at least integral with the distal end of this image guide.

12. Method according to claim 11, characterized in that four strips are used constituting a piezoelectric tube which surrounds at least the distal end of the image guide, and in that, for each movement of the distal end of the image guide, a pair of opposite voltages is applied to two opposite strips respectively.

13. Method according to claim 1, characterized in that the spatial shift is obtained by a substantially lateral translation movement of the distal end of the image guide in two orthogonal directions.

14. Method according to claim 1, characterized in that the step of reconstructing the final image is carried out by means of a so-called iterative B-spline approximation algorithm for which the superimposition is considered as an irregular-point cloud.

15. Method according to claim 1, characterized in that the step of reconstructing the final image is followed by a step of deconvolution of the final image.

16. System implementing the method according to claim 1, for increasing the resolution of confocal images acquired through an image guide constituted by a plurality of optical fibres, the proximal end of this image guide being connected to a laser scanning device provided for emitting a laser beam into each optical fibre of the image guide and collecting each return beam during an acquisition, the distal end being associated with an optical head for focusing the laser beam emitted by the image guide in an object under observation, characterized in that, for a given position of the optical head, this system comprises:

- means for producing a plurality of acquisitions through the image guide,
- means for spatially shifting, at each acquisition, said distal end of the image guide relative to the optical head,
- means for transforming the data of each acquisition into a point cloud weighted by the optical power measured on the object through each optical fibre of the image guide,
- means for positioning each point cloud,
- means for superimposing the thus-positioned point clouds, and
- means for reconstructing a final image from this superimposition.

17. Device for increasing the resolution of confocal images acquired through an image guide constituted by a plurality of optical fibres, the proximal end of this image guide being connected to a laser scanning device provided for emitting a laser beam into each optical fibre of the image guide and collecting each return beam during an acquisition, the distal end being associated with an optical head for focusing the laser beam emitted by the image guide in an object under observation, characterized in that the optical head comprises optical means integral with this optical head, and in that the device also comprises a piezoelectric tube surrounding the image guide and integral with this image guide, at least at said distal end, so as to spatially shift this distal end relative to the optical head in response to a shift order.

18. Device according to claim 17, characterized in that the piezoelectric tube is constituted by at least four independent ceramic strips each occupying a quarter of the tube.

19. Device according to claim 18, characterized in that internal and external faces of each strip can be covered with metallic material, such as silver, such that the application of opposite voltages to two opposite strips respectively shifts the distal end of the tube by exploiting the transverse piezoelectric effect.

20. Device according to claim 18, characterized in that the ceramic strips are controlled two by two in two orthogonal directions.

* * * * *

UNITED STATES PATENT AND TRADEMARK OFFICE
CERTIFICATE OF CORRECTION

PATENT NO. : 7,646,938 B2
APPLICATION NO. : 10/585083
DATED : January 12, 2010
INVENTOR(S) : Berier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 867 days.

Signed and Sealed this

Twenty-eighth Day of December, 2010

David J. Kappos
*Director of the United States Patent and Trademark Office*